Patented Nov. 1, 1949

2,486,455

UNITED STATES PATENT OFFICE 2,486,455

TREATMENT OF ACIDIC COMPOSITIONS

Carl N. Zellner, New Providence, N. J., assignor to Tide Water Associated Oil Company, Bayonne, N. J., a corporation of Delaware No Drawing. Application May 8, 1946,
Serial No. 668,317

15 Claims. (Cl. 260—452)

This invention relates to organic acid compositions and to a method for recovering or separating acids from complex organic mixtures. More particularly, the invention is concerned with the treatment of complex acidic organic mixtures which may contain polyfunctional oxygenated compounds, to improve the quality and yield of acids recoverable therefrom.

The method of this invention has particular effectiveness when applied to the treatment of certain acidic compositions comprising, in intimate mixture, dibasic and monobasic acid substances of various molecular weights and other mono- and difunctional organic compounds. It is especially adaptable to the recovery of dibasic acids and other desired materials from the crude oxidation product, or suitable fractions thereof, resulting from the liquid phase oxidation of hydrocarbons with a free oxygen-containing gas by the method described in my copending application S. N. 625,961, filed October 31, 1945, of which the present application is a continuation-in-part; and the present invention will be described in illustrative embodiment hereinbelow in its application to the treatment of such hydrocarbon oxidation products.

This crude oxidation product is highly acidic in that it may have a saponification value of over 400 mgms. KOH per gram, as for example, 500 to 625. It contains simple and complex polyfunctional and monofunctional compounds in intimate mixture. Water-soluble and water-insoluble dibasic acids of the succinic acid series ranging from 4 to about 20 carbon atoms are present therein in free state in limited amounts, and as acidic compounds containing groups other than, or in addition to, carboxyl groups. The exact structure of all compounds making up this complex oxidation mixture is presently unknown, but analysis thereof for functional groups indicates the presence of ester and lactone linkages as well as carboxyl groups. Relatively few free hydroxyl groups are contained in these reactor products; and aldehydes, ketones and anhydrides appear to be virtually absent. Dibasic acids of the succinic acid series may be crystallized out only in limited amounts by simple cooling of the crude oxidation product. Extraction of the oxidation product with water to separate water-soluble and water-insoluble components often gives rise to troublesome emulsions.

It is desired to increase the acid yield, particularly the dibasic acid yield, and to further improve the recovery of dibasic acids and other valuable material from such complex mixtures.

This is accomplished by the method of the present invention which, in broad aspect, comprises subjecting the described acidic mixtures to controlled or selective heat treatment. The actual conditions employed in this heat treatment may vary somewhat, depending on the particular apparatus and type of charge material used and upon the exact results desired, but, in general, the selective pyrolysis or heat treatment is so regulated as to break down or convert certain potentially acid components to free acids, raise the ratio of acid value to saponification value, and to remove or decompose crystallization-inhibiting substances present, without causing excessive decarboxylation of the desired dibasic acids. Essentially, this is brought about in the pyrolysis by suitable control of the temperature and of the period of time at which the charge is allowed to remain at such temperature; these two factors being correlative in that, in general, the higher the temperature employed, the shorter the heating period. In the preferred procedure, the charge is maintained at the desired reaction temperature for a relatively short period, which may be a matter of seconds.

The process of this invention, in practical embodiment, may involve a continuous pyrolysis procedure in which a stream of the charge material is continuously conducted into a heated conversion zone and rapidly vaporized therein. In this manner, the desired conversion and a primary separation of products into an overhead or distillate fraction and residual fraction are accomplished in one heating operation. This pyrolysis desirably is conducted under atmospheric or subatmospheric pressure conditions. Operation under subatmospheric conditions is advantageous in permitting shorter contact time and less undesired decomposition. The charge material may be treated with advantage in the presence of steam or an inert gas, such as nitrogen.

One form of suitable apparatus for conducting the continuous pyrolysis comprises an externally heated, inverted cone-shaped steel reactor, open at its apex, into which a stream of the charge, preferably after being preheated, is conducted, desirably near the periphery of the cone at an angle so that as it vaporizes it will follow a spiral path down the inner surface of the cone. The charge may be propelled into the cone by high-pressure steam introduced into the charge stream after it leaves the preheater and just before its entrance into the converter. The resulting hot vapors are conducted to suitable condensing equipment, and the residue leaving the bottom of the cone at its open apex is collected. Example I illustrates one embodiment of the invention making use of this apparatus.

*Example I*

A highly acidic oxidation product, produced by oxidation of paraffin wax of 120° F. melting point, was heat treated in the apparatus just described by continuous introduction of a preheated stream of the charge, using steam as a carrier gas. The properties of the charge and products and the operating conditions are tabulated below.

Charge:
    Acid value _____ 314
    Saponification value _____ 521
    Acid/saponification ratio_____ 0.6

Operating conditions:
    Preheat temperature 246° C.
    Steam temperature _ 332° C.
    Reactor temperature 260° C.
    Charge rate _____ 19.7 pounds/hr.
    Steam rate _____ 320% by wt. of charge
    Partial pressure of
      distillate _____ 11.3 mm. of Hg
    Contact time (calculated) _____ 1.3 seconds Yields and quality of products:
  Distillate:
    Water solubles—25% by weight of the charge:
      Acid value _____ 582
      Saponification value _____ 683
      Acid/saponification ratio _____ 0.85
    Water insolubles—23% by weight of the charge:
      Acid value _____ 258
      Saponification value _____ 370
      Acid/saponification ratio _____ 0.7
  Residue—43% by weight of the charge:
      Acid value _____ 207
      Saponification value _____ 415
      Acid/saponification ratio_____ 0.5

Improvement in quality resulting from the pyrolysis procedure of the above example is evidenced by the higher acid/saponification ratios of the distillate products as compared to that of the charge material, indicating presence of a greater percentage of free carboxyl groups. The distillate was found to be more readily water-extracted than was the charge material, with less formation of emulsions. The described water-soluble and water-insoluble distillate portions resulted from such extraction of the distillate from the pyrolysis treatment.

The nature and composition of the pyrolysis products may be expected to vary with use of various operating conditions. The water-soluble portion may contain, for example, about 70% of water-soluble free dibasic acids of the succinic acid series, a lesser proportion of esters and lactones and a relatively minor proportion of unstable compounds which are decomposable by distillation. The water-insoluble component of the pyrolysis distillate apparently contains various monofunctional compounds and relatively long chain water-insoluble dibasic acids of the succinic series, half-esters which are naphtha-soluble, naphtha-insoluble dibasic acids, lactonic compounds and probably dibasic esters of hydroxy acids. More ester groups than lactone groups are generally present in this component. Certain naphtha-insoluble compounds, containing three or more functional groups, are present.

Analysis indicates that the residual portion from the pyrolysis treatment; i.e., the portion which does not vaporize and distill over, comprises mainly highly oxygenated compounds and probably polyesters and polylactones averaging around four oxygenated groups per molecule. The average molecular weight of this residue is high; for example, it may be on the order of 500. Certain of the oxygenated groups of these compounds are potentially acid, and acids may be recovered therefrom by suitable procedure. For example, further yields of certain dibasic acids are obtained and other advantages realized by subjecting this residue or suitable fractions thereof to a continuous heat treatment similar to that described above. The latter procedure, particularly when the repeated heat treatment is conducted at temperatures higher than that of the initial heat treatment, may be expected to result in greater yields of water-soluble dibasic acids than the single initial heat treatment alone. Example II is illustrative of such procedure, in which the residue from Example I was charged to the converter in the same manner as described in Example I except that the operating conditions were as follows.

*Example II*

Operating conditions:
    Preheat temperature 280° C.
    Steam temperature _ 470° C.
    Reactor temperature 315° C.
    Charge rate _____ 11.2 pounds/hr.
    Steam rate _____ 230% by wt. of charge
    Partial pressure of
      distillate _____ 9.5 mm. of Hg
    Contact time (calculated) _____ 2.8 seconds The products were of the following character:
Yields and quality of products:
  Distillate:
    Water solubles—20% by weight of the charge:
      Acid value _____ 470
      Saponification value _____ 526
      Acid/saponification ratio _____ 0.9
    Water insolubles—29% by weight of the charge:
      Acid value _____ 207
      Saponification value _____ 353
      Acid/saponification ratio_____ 0.6
  Residue—28% by weight of the charge:
      Acid value _____ 145
      Saponification value _____ 319
      Acid/saponification ratio _____ 0.46

Vacuum distillation of the water solubles from the Example I product and crystallization and filtration of the resulting distillate gave 8.5% crude crystals of dibasic acids based on the charge to the continuous distillation. Similar vacuum distillation and crystallization of the water-soluble portion of the distillate from Example II gave an additional yield of 1.9% crude crystals of dibasic acids.

Vacuum distillation of the combined non-crystalline filtrates from the above filtrations yielded an additional 3.8% of crude dibasic acid crystals based on charge to continuous distillation.

The exact reactions occurring during this pyrolysis treatment defy determination since both the charge material and the product contain mono- and polyfunctional compounds whose chemistry is dependent not only upon chain length but upon juxtaposition of other active groups. However, since the products of the pyrolysis operation contain more readily crystallizable and distillable material than the charge to pyrolysis, it would appear that such operation results in removal and/or decomposition of substances of resinous nature and substances tending to inhibit crystallization.

The following specific examples will serve to further illustrate the method of the invention, including separation of crystalline dibasic acids from the pyrolysis products.

Example III

A refined paraffin wax of 120° F. melting point and derived from Pennsylvania crude was oxidized under controlled conditions in the manner described in my above-stated copending application by blowing air therethrough until the residual oxidation product reached a saponification value of 622 and an acid value of 397. The resulting oxidation product contained over 70% difunctional material of acidic character and only a trace of unsaponifiable substances. Upon cooling this product to room temperature, less than 5% crystals of dibasic acids were formed.

This oxidation product was subjected to the controlled pyrolysis of the invention by running a stream of it slowly into a two liter glass flask maintained at 280–300° C. and at about 10 mm. pressure. The rate of introduction of the charge was so regulated that it vaporized substantially immediately. The distillate product, which was collected in a suitable condenser, was high in mixed dibasic acids of saturated structure, containing from 4 carbon atoms up to about 20 carbon atoms. Crystals of dibasic acid, totalling 38% by weight of the material charged to the flask, were obtained upon batch vacuum distillation of this product and filtration of resulting distillate fractions. One of these fractions was taken at 130 to 185° C. at 3 mm. and another at 185 to 255° C. at 3 mm. The fractions were filtered separately, the first resulting in a 17% yield of dibasic acid crystals of 4 to 5 carbon atoms, and the second resulting in 21% crystals of dibasic acids of higher numbers of carbon atoms, most of which were from 6 to about 12 carbon atoms. The filtrates contained about 42% of non-crystalline dibasic material and monobasic acid compounds.

Example IV illustrates continuous heat treatment and distillation in the presence of steam at atmospheric pressure instead of under vacuum, as in previous examples.

Example IV

An oxidation product, resulting from controlled liquid phase oxidation of paraffin wax and characterized by a saponification value of 515 and an acid value of 297, was mixed with about one-third of its volume of water and the mixture was continuously run into a two liter glass flask maintained at about 305° C. and at atmospheric pressure at the rate of 6 cc. per minute. The resulting distillate product, which had saponification and acid values of 418 and 318, respectively, separated upon standing into an aqueous layer high in water-soluble dibasic acids having acid and saponification values of 600 and 690, respectively, and an oily layer containing most of the monobasic acids and having acid and saponification values of 235 and 341, respectively. A residue, amounting to about 6% of the charge, remained in the reactor. Besides free dibasic acids, the water-soluble portion of the product also contained a substantial proportion of various liquid lactonic compounds of corresponding chain length or longer, which may be separated by filtration from the crystalline dibasic acids.

The aqueous layer was drawn off and fractionally distilled under vacuum into suitable fractions which, when filtered, yielded a total of approximately 11% crystals of a mixture succinic acid and higher carbon atom dibasic acids based on weight of the charge to the pyrolytic treatment.

The dibasic acid products from the pyrolytic treatment, fractions thereof, or mixed crystalline dibasic acids separated therefrom are useful without further treatment as chemical intermediates in the preparation of plastics and synthetic fibers or plasticizers, and for other purposes. However, individual crystalline dibasic acids may be separated therefrom and further purified, if desired. Succinic, glutaric and suberic acids have been isolated by fractionation and recrystallization procedures. Dibasic acid in the carbon atom range of brassylic acid, having an acid value of 463 and being soluble in benzene and ether, was isolated in the form of white powdery crystals by filtration of a fraction (boiling between 214 and 230° C. at 5 mm.) of the water-insoluble portion of a distillate product derived by the continuous pyrolytic procedure. Dibasic acid in the range of pentadecanedioic acid ($C_{15}$), having an acid value of 420, was obtained in the form of fine white crystals from another close boiling fraction.

Further examples of the method of the invention, including runs in which higher reaction temperatures than those of the previous examples are used, are tabulated below In the four tabulated runs, the charge material was a hydrocarbon oxidation product of 381 acid value, 627 saponification value, 178 "lactone" value and 62 ester value. The apparatus comprised a two liter glass flask converter in runs 1 and 2 and a 250 cc. quartz flask converted in runs 3 and 4, connected to a suitable condenser system, the charge in each case being run into the hot flask in a slow continuous stream with nitrogen gas. All runs were at atmospheric pressure. In addition to the overhead product containing the dibasic acids, a dark, viscous residual fraction amounting to from 1 to 10% of the charge was formed.

In the method for determining ester values and "lactone" values, a portion of the oxidized product from the reactor was dissolved in alcohol and titrated in the usual way at room temperature with 1 N. KOH to find the acid value; then refluxed while adding KOH dropwise until the length of time during which the indicator color (thymolphthalein) persisted began to increase rapidly. The amount of KOH thus added dropwise represents the easily saponified material which, for convenience, may be termed "lactone value," since it has been found that lactones hydrolyze rapidly under these conditions whereas ordinary esters will remain unchanged for at least 15–30 minutes. Certain special esters which hydrolyze with extreme ease may be included in the term "lactone value." An excess of KOH then was added and the mixture was refluxed for 1 hour, after which it was titrated back with 1 N. hydrochloric acid to disappearance of color. The amount of alkali used up during the 1 hour reflux represents the ester value. Saponification value equals the sum of the acid, "lactone" and ester values.

| Run No. | Reactor Temperature | Rate of Charge to Reactor, gms./min. | Nitrogen Stream, l./min. | Approximate Average Contact Time, Seconds | Distillate Product Quality, mgs.KOH/gm. | | | | Ratio of Acid Value to Saponification Value |
|---|---|---|---|---|---|---|---|---|---|
| | | | | | Acid Value | Saponification Value | "Lactone" Value | Ester Value | |
| | °C. | | | | | | | | |
| 1 | 300 | 4.1 | 4 | 13 | 482 | 594 | 56 | 56 | 0.81 |
| 2 | 470 | 11.8 | 4 | 7 | 459 | 555 | 56 | 34 | 0.83 |
| 3 | 600 | 2.8 | 1 | 4 | 437 | 504 | 39 | 28 | 0.87 |
| 4 | 700 | 3.7 | 1 | 3 | 364 | 437 | | | 0.83 |

The improvement in product quality resulting from the tabulated runs is most readily understood from a comparison of acid/saponification ratios of the charge stock (0.61) with those of the products (0.81 to 0.87). The fact that this ratio is materially greater in the case of the product than in the case of the charge indicates that the product contains more free carboxyl groups than the charge. In run 4, it will be noted that the acid value of the product was lower than that of the charge material, indicating that some decarboxylation occurred during the pyroylsis treatment. The degree of decarboxylation is not considered excessive as long as the acid/saponification ratio is increased, for an increased acid/saponification ratio, even if accompanied by lowered acid values, results in improved quality and acid yield. Decrease in ester value and in "lactone" value of the products over corresponding values of the charge is significant in showing that decomposition of certain non-free acid compounds occurred during the heat treatment. Crystals of mixed dibasic acids, ranging from succinic on up to those of 15 carbon atoms and higher, were obtained from the products of the above table by fractional vacuum distillation.

It should be apparent from the above description that various apparatus and procedures for conducting the pyrolytic treatment of the invention may be employed. Also, it should be understood that operating conditions may vary somewhat with different types of apparatus, and with the particular results desired.

An important feature of the method of this invention, from an economical point of view, resides in the fact that it provides separation of dibasic acids from complex mixtures by purely physical means. Use of alkalies or other chemicals, which for economical operation would have to be recovered, is not required.

I claim:

1. A method for treating complex organic mixtures containing polybasic acids in non-crystalline form together with organic substances tending to inhibit crystallization of the non-crystalline polybasic acids, said complex organic mixtures being characterized by having a saponification value of at least about 400 and an acid value lower than the saponification value and prepared by partial oxidaton of hydrocarbons in liquid phase by reaction thereof with free oxygen of an oxygen-containing gas, which comprises subjecting the aforesaid complex mixture to flash pyrolysis at a temperature of about 250 to about 700° C. to selectively decompose at least a substantial amount of the components accounting for the difference between the acid and saponification values of said mixture without substantial decarboxylation of polybasic acids contained therein to produce a product having a higher acid to saponification ratio than the aforesaid mixture.

2. A method, as defined in claim 1, wherein vapors resulting from the pyrolysis of the complex mixture are condensed as a distillate, and separating crystals from the distillate.

3. A method, as defined in claim 1, wherein the complex organic mixture is subjected to rapid pyrolysis at a temperature of about 250 to about 500° C.

4. A method, as defined in claim 1, wherein the complex organic mixture is subjected to pyrolysis at a temperature between about 250 and about 700° C. for about thirteen seconds to about one second.

5. A method for producing crystalline dibasic acids from complex organic mixtures containing difunctional, non-crystalline, acidic compounds, said complex organic mixture being characterized by having a saponification value of at least about 400 and an acid value lower than the saponification value and prepared by partial oxidation of hydrocarbons in liquid phase by reaction thereof with free oxygen of an oxygen-containing gas, which comprises subjecting said mixture to rapid pyrolysis in the presence of steam at a temperature of about 250 to about 700° to decompose at least a substantial amount of components accounting for the difference between the acid and saponification values of said mixture without substantial decarboxylation of the aforesaid difunctional acidic compounds, condensing as a distillate the vapors resulting from the aforesaid pyrolysis, said distillate consisting of a water layer and an oily layer, and recovering dibasic acids from at least one of said layers.

6. A method, as defined in claim 5, wherein the rapid pyrolysis is conducted at a temperature of about 250 to about 500° C.

7. A method, as defined in claim 5, wherein the pyrolysis is conducted at a temperature of about 250 to about 700° C. for about thirteen seconds to about one second.

8. A method for improving the yield of crystalline dibasic acids from complex mixtures containing non-crystalline dibasic organic acids, said complex organic mixtures being characterized by having a saponification value of at least about 400 and an acid value lower than the saponification value and prepared by partial oxidation of hydrocarbons in liquid phase by reaction thereof with free oxygen of an oxygen containing gas, which comprises subjecting the aforesaid complex mixture to continuous rapid pyrolysis at a temperature of about 250 to about 700° C. to selectively decompose a substantial portion of the components accounting for the difference between the acid and saponification values of said mixture without substantial decarboxylation of the said non-crystalline dibasic organic acids to produce a distillate fraction relatively high in crystalline dibasic acids and a residual fraction, and subjecting said residual fraction to further pyrolysis to produce a distillate fraction containing additional amounts of dibasic acids.

9. A method, as defined in claim 8, wherein the pyrolysis of the residual fraction is conducted at a temperature higher than employed in the pyrolysis of the complex mixture.

10. A method for treating complex organic mixtures containing polybasic acids in non-crystalline form together with organic substances tending to inhibit crystallization of the polybasic acids, said complex organic mixture being characterized by having a saponification value of more than about 400, an acid value substantially less than the saponification value, and prepared by partial oxidation of hydrocarbons in liquid phase by reaction thereof with free oxygen of an oxygen-containing gas, said complex organic mixture being further characterized in that the substances tending to inhibit crystallization of the polybasic acids account for a substantial portion of the compounds comprising the difference between the acid and saponification value of said mixture, which comprises subjecting said complex mixture to flash pyrolysis at a temperature of about 250 to about 500° C. to selectively decompose a substantial portion of the crystallization-inhibiting compounds without substantial decarboxylation of polybasic acids in said mixture to obtain a distillate having a higher acid to saponification ratio than the aforesaid complex mixture.

11. A method, as defined in claim 10, wherein the rapid pyrolysis is conducted at a temperature of about 250 to 350° C.

12. A method, as defined in claim 10, wherein the distillate is condensed, and separating crystals from the distillate.

13. A composition comprising dibasic acids of the succinic acid series of various hydrocarbon chain lengths and heat stable compounds containing lactone groups, said composition having been prepared by subjecting to rapid pyrolysis a crude oxidized hydrocarbon mixture having a saponification value of at least about 400, an acid value lower than the saponification value and obtained by partial oxidation of hydrocarbons in liquid phase by reaction thereof with free oxygen of an oxygen-containing gas, said pyrolysis having been conducted at a temperature between about 250 to 700° C. sufficient to selectively decompose a substantial amount of the components accounting for the difference between the acid and saponification values of said mixture without substantial decarboxylation of polybasic acids contained therein, said composition being further characterized by having a higher acid to saponification ratio than the crude oxidized hydrocarbon mixture subjected to the aforesaid pyrolysis.

14. As a new composition, a distillate comprising a water-soluble portion containing dibasic acids of the succinic acid series and a water-insoluble portion containing dibasic acids of the succinic acid series of relatively long hydrocarbon chain length, said distillate having been prepared by rapid pyrolysis of a crude oxidized hydrocarbon mixture having a saponification value of at least about 400, an acid value lower than the saponification value and obtained by partial oxidation of hydrocarbons in liquid phase by reaction thereof with free oxygen of an oxygen-containing gas, said pyrolysis having been conducted at a temperature of about 250 to about 700° C. sufficient to selectively decompose at least a substantial amount of the components accounting for the difference between the acid and saponification value of said mixture without substantial decarboxylation of polybasic acids contained therein, said distillate being further characterized by having a higher acid value to saponification value ratio than the crude oxidized hydrocarbon mixture subjected to the aforesaid pyrolysis.

15. As a new composition, a high molecular weight residual fraction comprising highly oxygenated compounds averaging about 4 oxygenated groups per molecule, said composition having been obtained as the residual fraction from the rapid pyrolysis of a crude oxidized hydrocarbon mixture having a saponification value of at least about 400, an acid value lower than the saponification value and obtained by partial oxidation of hydrocarbons in liquid phase by reaction thereof with free oxygen of an oxygen-containing gas, said pyrolysis having been conducted at a temperature of about 250 to about 700° C. to selectively decompose at least a substantial amount of the components accounting for the difference between the acid and saponification values of said mixture without substantial decarboxylation of polybasic acids contained therein.

CARL N. ZELLNER.

REFERENCES CITED

The following references are of record in the file of this patent:

UNITED STATES PATENTS

| Number | Name | Date |
|---|---|---|
| 1,940,400 | Dietrich | Dec. 19, 1933 |
| 1,965,961 | Luther | July 10, 1934 |
| 2,054,979 | Jahrstorfer et al. | Sept. 22, 1936 |
| 2,216,238 | Harder | Oct. 1, 1940 |
| 2,237,301 | Burk et al. | Apr. 8, 1941 |
| 2,249,708 | Hicks-Bruun | July 15, 1941 |
| 2,323,861 | Zellner | July 6, 1943 |
| 2,330,525 | Shields | Sept. 28, 1943 |

FOREIGN PATENTS

| Number | Country | Date |
|---|---|---|
| 518,963 | Great Britain | Mar. 13, 1940 |
| 559,833 | Germany | Sept. 24, 1932 |